United States Patent
Lee et al.

(10) Patent No.: US 11,777,080 B2
(45) Date of Patent: Oct. 3, 2023

(54) NEGATIVE ELECTRODE FOR SECONDARY BATTERY

(71) Applicant: LG CHEM, LTD., Seoul (KR)

(72) Inventors: Hyeok Moo Lee, Daejeon (KR); Sol Nip Lee, Daejeon (KR); Song Taek Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 15/765,800

(22) PCT Filed: Jul. 4, 2017

(86) PCT No.: PCT/KR2017/007115
§ 371 (c)(1),
(2) Date: Apr. 4, 2018

(87) PCT Pub. No.: WO2018/008953
PCT Pub. Date: Jan. 11, 2018

(65) Prior Publication Data
US 2018/0287145 A1   Oct. 4, 2018

(30) Foreign Application Priority Data
Jul. 4, 2016 (KR) .................. 10-2016-0084358

(51) Int. Cl.
*H01M 4/36* (2006.01)
*H01M 4/133* (2010.01)
(Continued)

(52) U.S. Cl.
CPC .......... *H01M 4/366* (2013.01); *H01M 4/133* (2013.01); *H01M 4/587* (2013.01); *H01M 4/622* (2013.01);
(Continued)

(58) Field of Classification Search
CPC ...... H01M 4/366; H01M 4/133; H01M 4/583; H01M 4/587; H01M 4/622; H01M 4/625;
(Continued)

(56) References Cited

U.S. PATENT DOCUMENTS

| | | | |
|---|---|---|---|
| 8,383,267 | B2 | 2/2013 | Konishiike et al. |
| 9,214,671 | B2 | 12/2015 | Saruwatari et al. |

(Continued)

FOREIGN PATENT DOCUMENTS

| | | |
|---|---|---|
| CN | 101159324 A | 4/2008 |
| CN | 101587947 A | 11/2009 |

(Continued)

OTHER PUBLICATIONS

International Search Report (PCT/ISA/210) issued in PCT/KR2017/007115, dated Sep. 20, 2017.
(Continued)

*Primary Examiner* — Brittany L Raymond
(74) *Attorney, Agent, or Firm* — Morgan, Lewis & Bockius LLP

(57) ABSTRACT

Provided herein are a negative electrode and a secondary battery including the same. In particular, the negative electrode includes: a current collector; a first active material layer including first active material particles and disposed on the current collector; and a second active material layer including second active material particles and disposed on the first active material layer, in which a lithium ion diffusion rate of the second active material particles is two to three times that of the first active material particles.

15 Claims, 1 Drawing Sheet

(51) Int. Cl.
*H01M 4/587* (2010.01)
*H01M 4/62* (2006.01)
*H01M 10/0525* (2010.01)
*H01M 4/02* (2006.01)

(52) U.S. Cl.
CPC ....... *H01M 4/625* (2013.01); *H01M 10/0525* (2013.01); *H01M 2004/021* (2013.01); *H01M 2004/027* (2013.01); *H01M 2220/20* (2013.01)

(58) Field of Classification Search
CPC ....... H01M 10/0525; H01M 2004/021; H01M 2004/027; H01M 2220/20
See application file for complete search history.

(56) References Cited

U.S. PATENT DOCUMENTS

| | | | |
|---|---|---|---|
| 9,281,513 | B2 | 3/2016 | Takahata |
| 9,543,568 | B2 | 1/2017 | Sung et al. |
| 2007/0281214 | A1 | 12/2007 | Saruwatari et al. |
| 2009/0280413 | A1 | 11/2009 | Ohta et al. |
| 2009/0291371 | A1 | 11/2009 | Konishiike et al. |
| 2010/0075225 | A1 | 3/2010 | Wilkins et al. |
| 2010/0297500 | A1 | 11/2010 | Kawai et al. |
| 2012/0148922 | A1 | 6/2012 | Takahashi |
| 2013/0174370 | A1 | 7/2013 | Saruwatari et al. |
| 2013/0224584 | A1 | 8/2013 | Sung et al. |
| 2014/0162118 | A1 | 6/2014 | Chu et al. |
| 2014/0186702 | A1 | 7/2014 | Takahata |
| 2014/0227588 | A1 | 8/2014 | Kim et al. |
| 2014/0287316 | A1 | 9/2014 | Ahn et al. |
| 2016/0028084 | A1* | 1/2016 | Lee ................. H01M 4/386 429/231.8 |
| 2016/0087265 | A1 | 3/2016 | Saruwatari et al. |
| 2017/0125788 | A1 | 5/2017 | Ahn et al. |
| 2018/0190975 | A1* | 7/2018 | Ishii ................. H01M 10/0525 |
| 2018/0287145 | A1 | 10/2018 | Lee et al. |
| 2019/0097263 | A1* | 3/2019 | Azami ................. H01M 4/587 |

FOREIGN PATENT DOCUMENTS

| | | | |
|---|---|---|---|
| CN | 103201882 | A | 7/2013 |
| CN | 103733391 | A | 4/2014 |
| JP | H07-73868 | A | 3/1995 |
| JP | 2003-242966 | A | 8/2003 |
| JP | 2004-79370 | A | 3/2004 |
| JP | 2009-508302 | A | 2/2009 |
| JP | 2009-064574 | A | 3/2009 |
| JP | 2009-117240 | A | 5/2009 |
| JP | 2013-211254 | A | 10/2013 |
| JP | 2015-173103 | A | 10/2015 |
| JP | 6820341 | B2 | 1/2021 |
| KR | 10-2009-0016462 | A | 2/2009 |
| KR | 10-2009-0045350 | A | 5/2009 |
| KR | 10-2012-0124077 | A | 11/2012 |
| KR | 10-2014-0095980 | A | 8/2014 |
| KR | 10-2014-0099987 | A | 8/2014 |
| KR | 2015-0014800 | A | 2/2015 |
| WO | 2012001845 | A | 1/2012 |
| WO | WO 2013/018182 | A1 | 2/2013 |
| WO | WO-2015084036 | A1 * | 6/2015 .......... H01M 4/0471 |
| WO | 2016/018023 | A1 | 2/2016 |

OTHER PUBLICATIONS

Written Opinion (PCT/ISA/237) issued in PCT/KR2017/007115, dated Sep. 20, 2017.
European Search Report for Appl. No. 17824509.8 dated Jul. 17, 2018.

* cited by examiner

[Fig. 1]
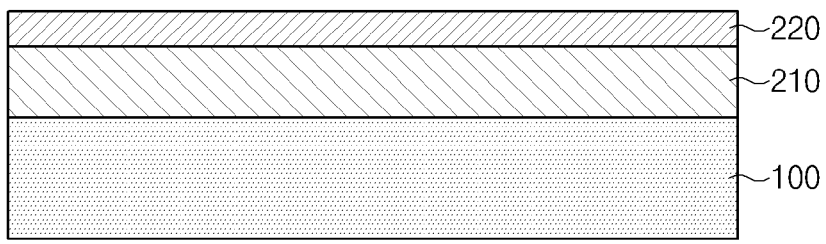
[Fig. 2]
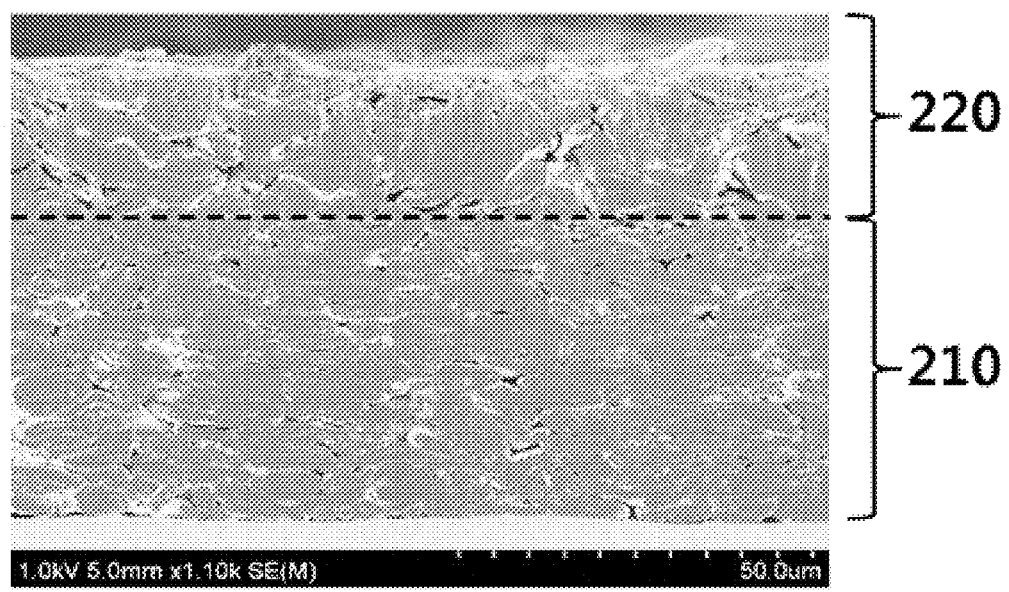
(a)
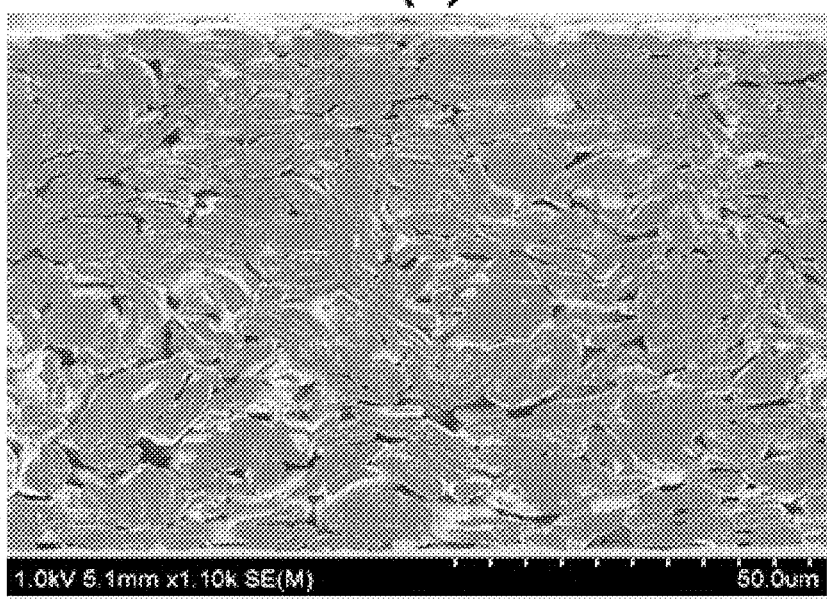
(b)

NEGATIVE ELECTRODE FOR SECONDARY BATTERY

TECHNICAL FIELD

Cross-Reference to Related Application

This application claims the priority benefit of Korean Patent Application No. 10-2016-0084358, filed on Jul. 4, 2016, in the Korean Intellectual Property Office, the disclosure of which is incorporated herein in its entirety by reference.

Technical Field

The present invention relates to a negative electrode and a secondary battery including the same, in which the negative electrode may include first and second active material layers, and a lithium ion diffusion rate of active material particles of the second active material layer is two to three times that of active material particles of the first active material layer.

BACKGROUND ART

Due to a rapid increase in the use of fossil fuels, there is an increasing demand for the use of alternative energy or clean energy, and thus research into power generation and energy accumulation fields, which use an electrochemical reaction, is most actively conducted.

As a representative example of electrochemical devices using such electrochemical energy, secondary batteries are currently used and use thereof tends to gradually expand. Recently, in line with an increase in development of technology for portable devices, such as portable computers, mobile phones, cameras, and the like, and demand therefor, demand for secondary batteries as energy sources is rapidly increasing. Among such secondary batteries, much research into lithium secondary batteries, which have high energy density, high operating voltage, long cycle lifespan, and low self-discharge rate, has been conducted, and such lithium secondary batteries are commercially available and widely used.

Generally, a secondary battery consists of a positive electrode, a negative electrode, an electrolyte, and a separator. In the secondary battery, energy transfer occurs while lithium ions reciprocate between opposite electrodes such that, through $1^{st}$ charging, lithium ions from a positive active material are intercalated into a negative active material such as carbon particles and, during discharging, the lithium ions are deintercalated, and, in this way, the secondary battery can be charged and discharged. natural graphite or the like is used alone, problems such as poor charging performance occur even though achieving high capacity. Thus, to achieve improvement on both high capacity of a negative electrode and charge/discharge performances, conventionally, a mixture of an active material having a large lithium binding amount and an active material with excellent charge/discharge capacity is generally used in a single active material layer.

However, when the above-described method is used, the active material with excellent charge/discharge capacity cannot be sufficiently positioned at a surface of a negative electrode, and thus, lithium ions cannot be smoothly diffused. Accordingly, there is a limitation in improvement of charging performance, and an electrode is corroded by side reaction at the surface of a negative electrode, or byproducts are generated at the surface thereof, whereby performance of the negative electrode deteriorates.

Therefore, there is a need to develop a negative electrode that may maintain high capacity, exhibit excellent charging performance, and suppress side reactions at a surface thereof.

DISCLOSURE INVENTION

Technical Problem

An aspect of the present invention provides a negative electrode in which a high-capacity battery with enhanced charging/discharging performance may be manufactured using the same, and generation of byproducts by lithium deposition at a surface thereof is minimized.

Solution to Problem

An embodiment of the present invention provides a negative electrode including: a current collector; a first active material layer including first active material particles and disposed on the current collector; and a second active material layer including second active material particles and disposed on the first active material layer, wherein a lithium ion diffusion rate of the second active material particles is two to three times that of the first active material particles.

Advantageous Effects of Invention

In a negative electrode according to the present invention, a second active material layer including second active material particles having a high lithium ion diffusion rate is disposed at a surface thereof, and thus lithium ions are smoothly diffused at the surface thereof, and, accordingly, charging performance of a battery may be enhanced and generation of byproducts by lithium deposition at the surface thereof may be minimized. In addition, a first active material layer including first active material particles capable of increasing a lithium binding amount is disposed on a current collector, and thus a high-capacity battery may be manufactured using the negative electrode.

BRIEF DESCRIPTION OF DRAWINGS

FIG. 1 is a cross-sectional view of a negative electrode according to an embodiment of the present invention.

FIG. 2 illustrates a cross-sectional image (see (a)) of the embodiment of the present invention and a cross-sectional image (see (b)) of a comparative example.

MODE FOR THE INVENTION

Hereinafter, the present invention will be described in more detail to aid in understanding of the present invention.

Terms or words used in the present specification and claims should not be construed as limited to ordinary or dictionary meanings, and, based on the principle that inventors can appropriately define the concepts of terms to explain the invention in the possible way, should be interpreted as meanings and concepts in accordance with the technical spirit of the present invention.

Terms used in the present specification are provided only to explain exemplary embodiments and are not intended to limit the present invention. An expression in the singular includes an expression in the plural unless the context clearly indicates otherwise.

In the present specification, it should be understood that terms, such as "include," "comprise," "have," and the like are used to indicate the presence of stated features, numbers, steps, elements, or a combination thereof without precluding the presence or addition of one or more other features, numbers, steps, elements, or combinations thereof.

Referring to FIG. 1, a negative electrode according to an embodiment of the present invention includes: a current collector 100; a first active material layer 210 including first active material particles and disposed on the current collector 100; and a second active material layer 220 including second active material particles and disposed on the first active material layer, in which a lithium ion diffusion rate of the second active material particles is two to three times that of the first active material particles.

The current collector may be formed of any material that does not cause any chemical change in a secondary battery, for example, copper, stainless steel, aluminum, nickel, titanium, calcined carbon, or aluminum, or stainless steel that is surface-treated with carbon, nickel, titanium, silver, or the like.

The first active material layer may be disposed on the current collector, in particular, on a surface or opposite surfaces of the current collector. In addition, the second active material layer may be disposed on the first active material layer.

The first active material layer may include first active material particles, and the second active material layer may include second active material particles. Each of the first and second active material particles may be independently a graphite-based active material or a silicon-based active material. The graphite-based active material may be one or more selected from the group consisting of artificial graphite, natural graphite, graphitized carbon fiber, and graphitized mesocarbon microbeads. The silicon-based active material may be one or more selected from the group consisting of Si, $SiO_x$ where $0<x<2$, a Si—C composite, and a Si—Y alloy where Y is an alkali metal, an alkali earth metal, a transition metal, a Group 13 element, a Group 14 element, a rare-earth element, and combinations thereof. In particular, when Si is used, a high-capacity battery may be obtained.

In particular, the first active material particles may be natural graphite, and the second active material particles may be artificial graphite. Natural graphite has a large lithium binding amount, and thus, when used as the first active material particles, a high-capacity negative electrode may be obtained. In addition, a negative electrode with excellent charging performance may be obtained using artificial graphite as the second active material particles. Furthermore, since the second active material layer is disposed on a surface of the negative electrode, the second active material particles primarily, not the first active material particles, react with an electrolytic solution. At this time, when artificial graphite is used as the second active material particles, charging performance of the negative electrode may be enhanced due to high lithium absorbing capability, and the occurrence of a side reaction at a surface of the negative electrode by deposition of lithium ions may be minimized.

The lithium ion diffusion rate of the second active material particles may be two to three times, in particular 2-fold to 2.5-fold, that of the first active material particles.

The lithium ion diffusion rate refers to a degree to which lithium ions are diffused in a particular material. Although not particularly limited, the lithium ion diffusion rate may be measured using a galvanostatic intermittent titration technique (GITT) in charged/discharged states. For example, in one embodiment of the present invention, the lithium ion diffusion rate may be measured using a GITT under a condition of SOC 50%.

The lithium ion diffusion rate of the second active material particles is relatively high, and thus lithium ions may be more smoothly diffused on the second active material layer. In addition, generally, as the lithium ion diffusion rate of active material particles is high, the energy density of an electrode may be reduced due to a small lithium binding amount. However, in one embodiment of the present invention, high capacity may be maintained by the first active material layer including first active material particles. Thus, the negative electrode may have enhanced capacity due to organic binding between the first and second active material particles that satisfy the above-described ranges, and charging performance may be further enhanced. In particular, the first active material particles may have a lithium ion diffusion rate of $5.0 \times 10^{-9}$ cm$^2$/s to $7.0 \times 10^{-9}$ cm$^2$/s, and the second active material particles may have a lithium ion diffusion rate of $1.0 \times 10^{-8}$ cm$^2$/s to $2.0 \times 10^{-8}$ cm$^2$/s.

As described above, the lithium ion diffusion rate of the first active material particles or the second active material particles may be adjusted so that the lithium ion diffusion rate of the second active material particles is two to three times that of the first active material particles. Although not particularly limited, in one embodiment, an orientation index of the second active material particles may be adjusted so that the lithium ion diffusion rate of the second active material particles is two to three times that of the first active material particles.

The orientation index may be obtained by performing XRD measurement on natural graphite or artificial graphite. More particularly, an area ratio of (004)/(110), obtained by measuring planes (110) and (004) of artificial graphite by XRD and then integrating the intensity of a peak for the (110) plane and the intensity of a peak for the (004) plane, may correspond to the orientation index.

When artificial graphite is used as the second active material particles, the artificial graphite may have an orientation index of 12 to 14, in particular, 12 to 13. General artificial graphite has a high orientation index, i.e., 20 or more, but, in one embodiment of the present invention, the lithium ion diffusion rate may be improved by decreasing the orientation index of artificial graphite to 12 to 14.

Although not particularly limited, a method of reducing the orientation index of artificial graphite to 12 to 14 is as follows: A coal-based pitch, a petroleum-based pitch, and the like are mixed, and then calcined to prepare secondary particles, and the resulting secondary particles are graphitized at a temperature of 2,500° C. or more, thereby completing the preparation of artificial graphite having an orientation index of 12 to 14.

The content of the second active material particles may be in the range of 10% to 90%, in particular, 30% to 90%, with respect to the total content of the first and second active material particles. When the content of the second active material particles is greater than 90%, the content of the first active material particles may be decreased, resulting in a decrease in capacity of the negative electrode. On the other hand, when the content of the second active material particles is less than 10%, charging performance improvement effects derived from the second active material particles may be insignificant.

The first active material layer may further include a first binder and a conductive material, and the second active material layer may further include a second binder and the conductive material.

Each of the first and second binders may be independently at least one of polyvinylidene fluoride (PVdF), carboxymethyl cellulose (CMC), styrene-butadiene rubber (SBR), polyacrylonitrile, polymethylmethacrylate, polyvinyl alcohols, starch, hydroxypropylcellulose, regenerated cellulose, polyvinyl pyrrolidone, tetrafluoroethylene, polyethylene, polypropylene, polyacrylic acid, ethylene-propylene-diene monomers (EPDMs), sulfonated EPDMs, fluorine rubber, polymers obtained by substituting hydrogen atoms of the aforementioned materials with Li, Na, Ca, or the like, and various copolymers. For example, the first and second binders may be various types of binders, such as copolymers of at least one selected from the group consisting of PVdF, CMC, and SBR with hexafluoropropylene (HFP), and the like. The first and second binders may be identical to each other or different from each other.

In particular, the first binder may be at least one selected from the group consisting of PVdF, CMC, and SBR. In this case, adhesion between the first active material particles and adhesion between the first active material particles and the current collector may be further enhanced.

In addition, in particular, the second binder may be a copolymer of at least one selected from the group consisting of PVdF, CMC, and SBR with hexafluoropropylene (HFP). In this case, the second active material layer may have high electrolyte impregnability.

The conductive material is not particularly limited as long as it does not cause any chemical change in the fabricated battery and has conductivity. Examples of the conductive material include graphite such as natural graphite, artificial graphite, and the like; carbon black, acetylene black, Ketjen black, channel black, furnace black, lamp black, thermal black, and the like; conductive fibers such as carbon fibers, metal fibers, and the like; conductive tubes such as carbon nanotubes, and the like; metal powders of fluorocarbon, aluminum, nickel, or the like; conductive whiskers of zinc oxide, potassium titanate, and the like; conductive metal oxides such as titanium oxide, and the like; polyphenylene derivatives; and the like.

The negative electrode according to an embodiment of the present invention may be fabricated by coating a current collector with a slurry, prepared by mixing an electrode mixture including active material particles, a conductive material, and a binder with a solvent, followed by drying and roll pressing. In particular, a first active material layer may be formed on a current collector using the above-described method, and then a second active material layer may be formed on the first active material layer. The second active material layer may be formed using one of or a combination of two or more of screen printing, inkjet printing, spraying, gravure printing, heat transferring, a Toppan printing method, intaglio printing, and offset printing. The solvent may be any solvent commonly used in the art, for example, dimethyl sulfoxide (DMSO), isopropyl alcohol, N-methylpyrrolidone (NMP), acetone, water, or the like, and one of or a mixture of two or more of these solvents may be used.

A secondary battery according to another embodiment of the present invention may include a negative electrode, a positive electrode, a separator between the positive electrode and the negative electrode, and an electrolyte, and the negative electrode may be an electrode according to an embodiment of the present invention.

The separator may be any separator used in general secondary batteries as long as it separates a negative electrode from a positive electrode and provides a transfer path for lithium ions. In particular, a separator having low resistance to ion transfer in an electrolyte and having an excellent electrolyte-retaining ability may be used. For example, the separator may be a porous polymer film, for example, a porous polymer film formed of a polyolefin-based polymer, such as an ethylene homopolymer, a propylene homopolymer, an ethylene/butene copolymer, an ethylene/hexene copolymer, an ethylene/methacrylate copolymer, or the like, or a stacked structure having two or more layers formed of these materials. In addition, the separator may be a general porous non-woven fabric, for example, a non-woven fabric made of high melting point-glass fiber, polyethylene terephthalate fiber, or the like. In addition, to secure thermal resistance or mechanical strength, a separator coated with a ceramic component or a polymer material may also be used, and, optionally, a structure having one or more layers of these materials may be used.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, or the like, which may be used to manufacture lithium secondary batteries, but the present invention is not limited thereto.

In particular, the electrolyte may include a non-aqueous organic solvent and a metal salt.

The non-aqueous organic solvent may be, for example, an aprotic organic solvent such as N-methyl-2-pyrrolidinone, propylene carbonate, ethylene carbonate, butylene carbonate, dimethyl carbonate, diethyl carbonate, ethyl methyl carbonate, vinylene carbonate, γ-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

In particular, among the carbonate-based organic solvents, ethylene carbonate and propylene carbonate, which are a type of cyclic carbonate, may be used due to high permittivity as a high-viscosity organic solvent, thus satisfactorily dissociating a lithium salt. When such a cyclic carbonate is used in combination with a low-viscosity, low-permittivity linear carbonate, such as dimethyl carbonate and diethyl carbonate, at an appropriate ratio, an electrolyte having high electrical conductivity may be prepared, and thus such cyclic carbonates are more preferably used.

The metal salt may be a lithium salt, and the lithium salt may be a material that is readily soluble in the non-aqueous electrolyte. For example, an anion of the lithium salt may be one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

To enhance battery lifespan characteristics, suppress a decrease in battery capacity, enhance battery discharge capacity, and the like, the electrolyte may further include, in addition to the above-described electrolyte components, for example, one or more additives of a haloalkylene carbonate-based compound such as difluoroethylene carbonate, and the like, pyridine, triethylphosphite, triethanolamine, cyclic ether, ethylene diamine, n-glyme, hexaphosphoric acid triamide, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol, aluminum trichloride, and the like.

According to another embodiment of the present invention, there is provided a battery module including the secondary battery as a unit cell and a battery pack including the same. Since the battery module and the battery pack include the secondary battery having high capacity, high rate characteristics, and cycle characteristics, and thus, may be used as power sources of middle- and large-scale devices selected from the group consisting of electric vehicles, hybrid electric vehicles, plug-in hybrid electric vehicles, and systems for storing power.

EXAMPLES AND COMPARATIVE EXAMPLES

Preparation Example 1

Preparation of Artificial Graphite, Lithium Ion Diffusion Rate and Orientation Index of Which Were Adjusted A coal-based pitch and a petroleum-based pitch were mixed, and then dissolved in THT to prepare a mixed pitch solution, and the mixed pitch solution was evaporated to prepare a mixed pitch. Subsequently, the mixed pitch was calcined to prepare secondary particles having a mean particle diameter ($D_{50}$) of 19 μm, and the secondary particles are graphitized at a temperature of 2,800° C., thereby completing the preparation of artificial graphite having a lithium ion diffusion rate of $1.69×10^{-8}$ cm$^2$/s and an orientation index of 13.

Example 1 and Comparative Examples 1 to 4

Fabrication of Negative Electrodes

Example 1

(1) Preparation of First Active Material Layer 95.6 wt % of natural graphite having a lithium ion diffusion rate of $5.88×10^{-9}$ cm$^2$/s as first active material particles of a first active material layer, 1.0 wt % of carbon black (Super C65) as a conductive material, 2.3 wt % of SBR as a binder, and 1.1 wt % of CMC were added to distilled water to prepare a slurry for forming a first active material layer. The slurry for forming a first active material layer was applied on a copper foil having a thickness of 20 μm as a negative electrode current collector, dried, and roll-pressed, thereby completing the formation of a first active material layer (see 210 of FIG. 2(a)) having a thickness of 60 μm on the current collector.

(2) Fabrication of Second Active Material Layer and Negative Electrode 95.6 wt % of the artificial graphite prepared according to Preparation Example 1 as second active material particles of a second active material layer, 1.0 wt % of carbon black (Super C65) as a conductive material, 2.3 wt % of SBR as a binder, and 1.1 wt % of CMC were added to distilled water to prepare a slurry for forming a second active material layer. The slurry for forming a second active material layer was applied on the first active material layer, dried, and roll-pressed, to form a second active material layer (see 220 of FIG. 2(a)) having a thickness of 30 μm on the current collector, thereby completing the fabrication of a negative electrode having a total thickness of 110 μm. The content of the second active material particles in the fabricated negative electrode was 30% based on the total content of the first and second active material particles.

Comparative Example 1

95.6 wt % of natural graphite having a lithium ion diffusion rate of $5.88×10^{-9}$ cm$^2$/s as active material particles, 1.0 wt % of carbon black (Super C65) as a conductive material, 2.3 wt % of SBR as a binder, and 1.1 wt % of CMC were added to distilled water to prepare a slurry for forming an active material layer. The slurry for forming an active material layer was applied on a copper foil as a negative electrode current collector, dried, and roll-pressed, to form an active material layer having a thickness of 90 μm on the current collector, thereby completing the fabrication of a negative electrode having a total thickness of 110 μm.

Comparative Example 2

95.6 wt % of the artificial graphite of Preparation Example 1 as active material particles, 1.0 wt % of carbon black (Super C65) as a conductive material, 2.3 wt % of SBR as a binder, and 1.1 wt % of CMC were added to distilled water to prepare a slurry for forming an active material layer. The slurry for forming an active material layer was applied on a copper foil as a negative electrode current collector, dried, and then roll-pressed, to form an active material layer having a thickness of 93 μm on the current collector, thereby completing the fabrication of a negative electrode having a total thickness of 113 μm.

Comparative Example 3

Process 1: Fabrication of Negative Electrode 66.9 wt % of natural graphite having a lithium ion diffusion rate of $5.88×10^{-9}$ cm$^2$/s, 28.7 wt % of the artificial graphite of Preparation Example 1, 1.0 wt % of carbon black (Super C65) as a conductive material, 2.3 wt % of SBR as a binder, and 1.1 wt % of CMC were added to distilled water and stirred therein to prepare a slurry for forming an active material layer. The slurry for forming an active material layer was applied on a copper foil having a thickness of 20 μm as a negative electrode current collector, dried, and then roll-pressed, to form an active material layer having a thickness of 91 μm on the current collector, thereby completing the fabrication of a negative electrode having a total thickness of 111 μgm (see FIG. 2(b)).

Comparative Example 4

Process 1: Fabrication of Negative Electrode

A negative electrode was manufactured in the same manner as in Example 1, except that artificial graphite having a lithium ion diffusion rate of $6.02×10^{-9}$ cm$^2$/s and an orientation index of 21.5 was used as the second active material particles, instead of the artificial graphite of Preparation Example 1.

Experimental Example 1

Capacity Evaluation

Capacities of batteries including the negative electrodes manufactured according to Example 1 and Comparative Examples 1 to 4 were respectively evaluated. Prior to evaluation, coin half-cells including the respective negative electrodes of Example 1 and Comparative Examples 1 to 4 were manufactured. Each negative electrode was cut into a circular shape having an area of 1.4875 cm² to be used as a negative electrode, and Li metal was used as a positive electrode. A porous polyethylene separator was disposed between the positive electrode and the negative electrode, followed by injection of an electrolytic solution, prepared by dissolving 0.5 wt % of vinylene carbonate in a mixed solution of ethyl methyl carbonate (EMC) and ethylene carbonate (EC) mixed at a volume ratio of 7:3 and dissolving 1 M LiPF$_6$ therein, thereby completing the manufacture of a coin half-cell including a sheet of Li-metal and a sheet of the negative electrode.

The capacity of each battery was evaluated using discharge capacity measured by performing charging and discharging processes once at a current (0.1 C-rate) that was 1/10 a value corresponding to actual capacity of each battery at a voltage ranging from 0.05 V to 1.5 V and room temperature (25° C.). At this time, the discharge capacity is represented as capacity per unit electrode weight by dividing the measured capacity by the weight of the corresponding negative electrode. The results thereof are shown in Table 1 below.

TABLE 1

| Battery capacity evaluation | | | | | |
|---|---|---|---|---|---|
| Type of negative electrode | Example 1 | Comparative Example 1 | Comparative Example 2 | Comparative Example 3 | Comparative Example 4 |
| Capacity (mAh/g) | 357.96 | 361.63 | 349.40 | 357.96 | 360.00 |

Referring to Table 1 above, it can be confirmed that the capacity of Example 1 is maintained at a level similar to that of each of Comparative Examples 1, 3, and 4 including natural graphite, and is higher than that of Comparative Example 2 including artificial graphite alone. That is, according to the present invention, it can be confirmed that, although the electrode includes artificial graphite with an enhanced lithium ion diffusion rate, the first active material layer includes natural graphite, and thus battery capacity is maintained at a high level.

Example 2 and Comparative Examples 5 to 8: Manufacture of Batteries

A battery was manufactured using each of the negative electrodes of Example 1 and Comparative Examples 1 to 4.

In particular, LiNi$_{0.6}$Mn$_{0.3}$Co$_{0.2}$O$_2$, polyvinylidene fluoride, and carbon black at a weight ratio of 96:2:2 were mixed with N-methylpyrrolidone to prepare a positive electrode slurry. An aluminum (Al) foil having a thickness of 12 μm was coated with the positive electrode slurry to a thickness of 105 μm to fabricate an electrode plate, followed by drying at 135 for 3 hours or more and roll-pressing, thereby completing the fabrication of a positive electrode including the Al foil and having a thickness of 79 μm. At this time, the positive electrode had a loading amount of 4.4 mAh/cm², an NP ratio of 108, and a porosity of 25%. A porous polyethylene separator was disposed between each of the negative electrodes of Example 1 and Comparative Examples 1 to 4 and the fabricated positive electrode, followed by injection of an electrolytic solution, prepared by dissolving 0.5 wt % of vinylene carbonate in a mixed solution of ethyl methyl carbonate (EMC) and ethylene carbonate (EC) mixed at a volume ratio of 7:3 and dissolving 1 M LiPF$_6$ therein, thereby completing the manufacture of batteries of Example 2 and Comparative Examples 5 to 8.

Experimental Example 2

Charging Performance Evaluation

Each of the batteries of Example 2 and Comparative Examples 5 to 8 was charged, and then discharged at 1/3 C until the voltage reached 2.5 V, and then the capacity of each battery at which lithium started to be deposited was measured while charging each battery at 1.6 C, and the measurement results thereof are shown in Table 2 below.

TABLE 2

| Battery evaluation | | | | | |
|---|---|---|---|---|---|
| Type of battery | Example 2 | Comparative Example 5 | Comparative Example 6 | Comparative Example 7 | Comparative Example 8 |
| Type of negative electrode | Example 1 | Comparative Example 1 | Comparative Example 2 | Comparative Example 3 | Comparative Example 4 |
| Charge ratio (%) | 64.1 | 56 | 69 | 58.8 | 58 |

Referring to Table 2 above, it can be confirmed that, compared to Comparative Example 7 using a single layer formed of a mixture of natural graphite and artificial graphite with an enhanced lithium ion diffusion rate, the battery of Example 2 exhibits excellent charging performance. That is, it can be confirmed that the time at which lithium ions are deposited may be delayed by positioning artificial graphite with an enhanced lithium ion diffusion rate on a surface of the electrode primarily contacting the electrolytic solution. In addition, it can be confirmed that, compared to Comparative Example 8 using artificial graphite without improvement on a lithium ion diffusion rate (a low level), the battery of Example 2 using artificial graphite with an enhanced lithium ion diffusion rate exhibits excellent charging performance.

Although exemplary embodiments of the present invention have been described in detail, the scope of the present invention should not be construed as being limited by the embodiments set forth herein. In addition, various changes and modifications, made by those of ordinary skill in the art using basic concepts of the present invention defined by the following claims, should be interpreted as within the scope of the present invention.

The invention claimed is:

1. A negative electrode comprising:
   a current collector;
   a first active material layer comprising first active material particles and disposed on the current collector; and
   a second active material layer comprising second active material particles and disposed on the first active material layer,
   wherein a lithium ion diffusion rate of the second active material particles is two to three times a lithium ion diffusion rate of the first active material particles,
   the first active material particles comprise natural graphite, and the second active material particles comprise artificial graphite,
   the artificial graphite has an orientation index of 12 to 14,
   the first active material layer further comprises a first binder and a conductive material, and the second active material layer further comprises a second binder and the conductive material,
   the second binder comprises a copolymer of hexafluoropropylene (HFP) and at least one selected from the group consisting of polyvinylidene fluoride (PVdF), carboxymethyl cellulose (CMC), and styrene-butadiene rubber (SBR), a content of the second active material particles ranges from 30% to 90% with respect to a total content of the first and second active material particles, and the lithium ion diffusion rate of the first active material particles is in a range of $5.0 \times 10^{-9}$ cm$^2$/s to $7.0 \times 10^{-9}$ cm$^2$/s, and the lithium ion diffusion rate of the second active material particles is in a range of $1.0 \times 10^{-8}$ cm$^2$/s to $2.0 \times 10^{-8}$ cm$^2$/s, wherein the orientation index is an area ratio of (004)/(110) obtained by measuring planes (110) and (004) of the artificial graphite by XRD and then integrating an intensity of a peak for the (110) plane and an intensity of a peak for the (004) plane.

2. The negative electrode of claim 1, wherein the first binder and the second binder are different from each other.

3. The negative electrode of claim 1, wherein the first binder comprises at least one selected from the group consisting of polyvinylidene fluoride (PVdF), carboxymethyl cellulose (CMC), and styrene-butadiene rubber (SBR).

4. The negative electrode of claim 1, wherein the second binder comprises a copolymer of hexafluoropropylene (HFP) and polyvinylidene fluoride (PVdF).

5. The negative electrode of claim 1, wherein the second binder comprises a copolymer of hexafluoropropylene (HFP) and carboxymethyl cellulose (CMC).

6. The negative electrode of claim 1, wherein the second binder comprises a copolymer of hexafluoropropylene (HFP) and styrene-butadiene rubber (SBR).

7. The negative electrode of claim 1, wherein the conductive material comprises a conductive tube, a metal powder, a conductive whisker, a conductive metal oxide, or a polyphenylene derivative.

8. The negative electrode of claim 7, wherein conductive tube comprises carbon nanotubes.

9. The negative electrode of claim 7, wherein metal powder comprises a fluorocarbon metal powder, an aluminum powder, or a nickel powder.

10. The negative electrode of claim 7, wherein the conductive whisker comprises zinc oxide or potassium titanate.

11. A secondary battery comprising the negative electrode of claim 1, a positive electrode, a separator between the positive electrode and the negative electrode, and an electrolyte.

12. A battery module comprising the secondary battery of claim 11 as a unit cell.

13. A battery pack comprising the battery module of claim 12 and used as a power source of a device.

14. The battery pack of claim 13, wherein the device is an electric vehicle, a hybrid electric vehicle, a plug-in hybrid electric vehicle, or a power storage device.

15. A negative electrode comprising:
a current collector;
a first active material layer comprising first active material particles and disposed on the current collector; and
a second active material layer comprising second active material particles and disposed on the first active material layer,
wherein a lithium ion diffusion rate of the second active material particles is two to three times a lithium ion diffusion rate of the first active material particles,
the first active material particles comprise natural graphite, and the second active material particles comprise artificial graphite,
the artificial graphite has an orientation index of 12 to 14, and
the lithium ion diffusion rate of the first active material particles is in a range of $5.0 \times 10^{-9}$ cm$^2$/s to $7.0 \times 10^{-9}$ cm$^2$/s, and the lithium ion diffusion rate of the second active material particles is in a range of $1.0 \times 10^{-8}$ cm$^2$/s to $2.0 \times 10^{-8}$ cm$^2$/s,
wherein the orientation index is an area ratio of (004)/(110) obtained by measuring planes (110) and (004) of the artificial graphite by XRD and then integrating an intensity of a peak for the (110) plane and an intensity of a peak for the (004) plane.

* * * * *